Patented July 11, 1933

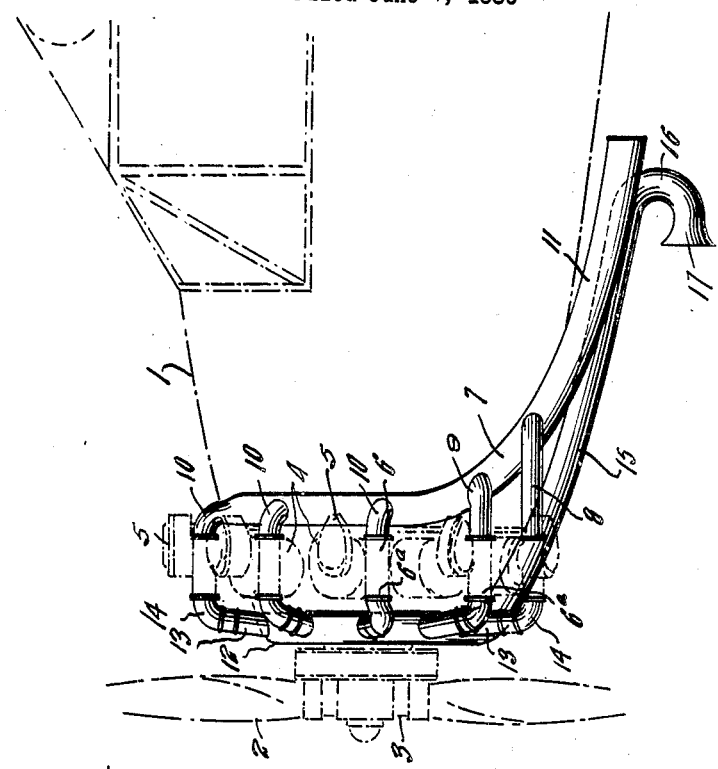

1,917,791

UNITED STATES PATENT OFFICE

GIUSEPPE M. BELLANCA, OF NEW CASTLE, DELAWARE

AIRCRAFT ENGINE

Application filed June 7, 1930. Serial No. 459,749.

This invention relates in general to aircraft engines, and more particularly has reference to a method and means for supplying air to the intake of aircraft engines.

In the past it has been customary to provide aircraft with engines of either the air or water-cooled type using carbureted fuel. The air for the intake in most cases has been taken directly into the carburetor from the surrounding atmosphere or from around the exhaust manifold. In some cases it has been supplied under pressure to the carburetor by means of a pump. While this pressure of the intake air is very desirable, such a pump obviously takes a certain amount of power to operate and multiplies the number of the moving parts, and is for these reasons undesirable.

More recently also engines operating on the Diesel principle have been developed for use in aircraft. This type of engine, as is well known, draws only air into the cylinder on the intake stroke. As in the case of engines using carburetors, it is desirable to increase the pressure of the intake air to facilitate its induction into the cylinder, and to permit a more efficient operation of the engine. It has been customary in this type of engine, to provide a single valve for the intake and exhaust of each cylinder. A single duct has been provided leading from each of these valves and at its external end this duct has been provided with two ports for intake and exhaust respectively. The intake port has been arranged to open to the front of the engine and the exhaust port has been arranged to open to the rear. Exhaust manifolds have been connected to the rearwardly opening ports and the velocity of the air stream has been relied upon to cause the intake air to be drawn through the front ports. This arrangement has proved satisfactory for certain conditions, but very unsatisfactory for others. For example, when the ship is at rest with its engine idling slowly there is not sufficient velocity in the air stream to prevent the exhaust gas from being expelled through the front ports. If the ship is of the open cockpit type, this gas will be blown rearwardly and directly into the faces of those working about the cockpits or entering or leaving the ship. If, on the other hand, the ship is of the cabin type, this gas would enter the cabin through any open door or vent and foul the air in the cabin. As is well known, this exhaust gas is toxic. This feature which allows these gases to be blown into the faces of the persons within the aircraft is therefore very undesirable and any means which might be provided for its elimination would be highly desirable.

To overcome the above and other disadvantages of prior construction in aircraft engines is one of the objects of this invention.

Another object of this invention is to provide an intake manifold for use in combination with a radial Diesel engine.

Still another object of this invention is to provide a Diesel engine for aircraft with an intake manifold in front of its cylinders and exhaust manifold to the rear of its cylinders.

Another object of this invention is to provide an intake manifold for aircraft engines which utilizes the velocity of the slip stream for supplying intake air to the engine under pressure.

Another object of this invention is to provide an intake manifold for an aircraft Diesel engine with its open end in such a position that, should any exhaust gases be emitted therefrom, they would not be able to reach the passenger-carrying parts of the aircraft.

Yet another object of this invention is to provide a circular intake manifold to be positioned in front of a radial engine for aircraft without interfering with the action of the cooling air stream on the cylinders.

Still another object of the present invention is to provide a method of supplying intake air under pressure to an aircraft engine through the utilization of the velocity of the air stream.

To accomplish the above and other important objects, my invention comprehends a means for scooping the intake air from the air stream at a point below and to the rear of the engine, conveying it to a position directly at the front of the engine, and distributing it to the various engine cylinders.

To insure an adequate comprehension of my invention, and wishing it to be distinctly understood that various modificactions may be made in the preferred embodiment herein shown and described without departing from the spirit or scope of my invention, reference is made to the accompanying drawing in which similar numerals indicate corresponding parts.

Figure 1 is a front view of a radial Diesel engine for aircraft illustrating my novel intake manifold attached thereto.

Figure 2 is a side view of the structure pictured in Figure 1, showing in detail the manner in which the scoop or funnel is formed on the open end of my novel intake manifold.

Referring now more particularly to the drawing, there is shown in outline a part of the fuselage 1 of a cabin type airplane equipped with a well known type of radial Diesel engine which I have selected for the purpose of illustration.

In this particular modification the propeller 2, shown in outline in Figure 2, is connected with the crank shaft of the engine by means of a flexible drive 3. The engine illustrated is provided with cylinders 4 arranged radially about the crank shaft and operating thereon in the well known manner. Upon each of the cylinders is mounted a stream line housing or casing 5 for the mechanism which operates the single valve. As will be seen from the drawing each cylinder is provided with exhaust and intake ports 6 and 6a both leading to said single valve and opening respectively to the rear and to the front of the engine. Connecting with the rearwardly opening ports 6 are two exhaust manifolds 7 having branches 8, 9 and 10 for communication with the said ports. These exhaust manifolds 7 have rearwardly extending portions 11 for conducting the exhaust gases downwardly and along the bottom of the fuselage of the airplane to such a position that they cannot be blown toward the passengers or operator of the ship.

Positioned in front of the engine and designated by the numeral 12 is my novel intake manifold for supplying air under pressure to the respective cylinders. This manifold, as it may be clearly seen in Figure 1, is of circular form, and is of such diameter that it will not interfere with the current of cooling air which is blown against the cylinder 4. It is also noted that by making the diameter of this circular manifold small enough so that it will not interfere with the cooling air stream it is also made small enough so that a fairing or cowling can be placed over it and a stream line effect secured. If desired also the manifold may itself be made up in stream line form. This circular portion of my intake manifold is provided with branches 13 at intervals throughout its circumference. These branches 13 are adapted to be connected to the forwardly opening ports 6a through the intermediary of the couplings 14.

At the lowermost point of this circular manifold I have provided a rearwardly extending conduit 15 which projects along the ship to a point below and preferably to the rear of the engine proper. At this point this conduit is bent as at 16, so that it opens to the front. Its open end is thus presented to the full force of the slip stream. In order that a sufficient amount of air may be gathered into the conduit and in order that this air might be raised by the velocity of the air stream to a pressure substantially higher than that of the atmosphere, I have provided on the open end of this conduit a bell or funnel-shaped portion 17 which presents a large area to the air stream.

The operation of my invention is at once apparent. When the engine is running the propeller will cause a considerable air stream to flow back over the surface of the fuselage. The funnel-shaped part 17 on the end of the rearwardly extending conduit 15, will present a substantial area to this air stream, and a considerable pressure will be built up within the conduit tending to force air through the conduit to the cylinders 4. On the intake stroke this air pressure will aid the pistons in drawing air into the cylinders. After the engine has completed its power stroke and the exhaust stroke has begun, this air pressure will tend to force the exhaust gases to the rear and out through the exhaust manifold 7 as they emerge from the single intake-exhaust valve. When the engine is idling at a very low speed, there may not be sufficient velocity in the air stream to prevent some of the exhaust gases from being forced out through the conduit 15 and the funnel 17. However, in case this happens, no ill effects will result because of the position of the opening of the intake manifold. Any gases which might be blown out through the funnel 17 will be at once turned toward the rear of the ship by the air stream from the propeller, and will be blown along the bottom of the ship and entirely away from its occupants.

From the foregoing, it will appear that I have provided a means whereby all the exhaust gases will be conducted downwardly and to the rear of the engine and will be positively directed away from the occupants of the aircraft.

It will also appear that I have provided an intake manifold for a Diesel engine which does not interfere with the cooling effect of the air stream on the cylinders and which provides air under pressure for the engine intake.

It is to be noted that my apparatus provides all of the advantages of the forwardly-opening intake port without any manifold, and that it does away with all of the disadvantages of such a structure. The greatest advantage of leaving the intake ports 6a open at their forward ends lies in the fact that this arrangement supplies air directly to the intake port and assists in blowing the exhaust out through the exhaust pipe. In the present construction the air is supplied to the intake ports by a more circuitous route, but due to the action of the funnel-shaped part 17, it is supplied under pressure and made just as available as by the former arrangement. Furthermore this arrangement absolutely insures against any of the exhaust gases being emitted in front of the engine and being blown backwardly toward the occupants of the machine by the propeller wash.

It is further noted that the manifold which I have supplied, does not in any way interfere with the action of the cooling air on the cylinders 4 and that it is susceptible of being covered by a fairing or cowling to reduce its air resistance.

It will be also observed that my invention is not limited in its application to Diesel engines of the type described but may be applied to other types of Diesel engines where an air stream is available or it may be applied to types of engines using carbureted fuel. The principle always remains the same, namely, that intake air is supplied under pressure by means of the funnel-shaped part 17 and that any exhaust or other gas which might be emitted from this funnel-shaped part 17 is emitted at such a point that the air stream will blow it away from instead of toward the operators or occupants.

I have shown my invention with reference to an airplane of the cabin type and while I have referred specifically to its application in the field of airplanes, I wish it to be clearly understood that its use is not confined to airplanes but may be used in any other type of aircraft or in any swiftly moving vehicle.

It will also be appreciated that while I have shown my manifold as being mounted in front of the engine, it might be mounted behind the engine without departing from the spirit and scope of my invention. In such a case branches would be provided extending between the cylinders to the intake ports.

It will be appreciated as above pointed out that various modifications may be made in the apparatus herein depicted and described without exceeding the scope of my invention as defined in the appended claims, it being distinctly understood that the prior art and the claims alone are to be definitive of my invention.

I claim:

1. A Diesel engine for aircraft having a plurality of cylinders, each having a common air inlet and exhaust passage an intake manifold in front of the cylinders and an exhaust manifold to the rear of its cylinders said intake manifold having an extension below and to the rear of the engine for supplying air under pressure to the cylinders.

2. A radial Diesel engine for aircraft having a plurality of cylinders, each having a common air inlet and exhaust passage an intake manifold in front of the cylinders and an exhaust manifold to the rear of its cylinders said intake manifold having an extension below and to the rear of the engine for supplying air under pressure to the cylinders.

3. In a radial Diesel engine for aircraft, having a plurality of cylinders, each cylinder having a common air inlet and exhaust passage a circular intake manifold for supplying air to the said passages said intake manifold having an extension below and to the rear of the engine for supplying air under pressure to the cylinders.

4. An intake manifold for a radial Diesel aircraft engine which engine includes a plurality of cylinders, each of which has a common air inlet and exhaust passage, comprising a funnel-shaped part adapted to scoop air from the propeller wash, a conduit for conducting the air from the funnel-shaped part to the engine, a circular distributing part positioned adjacent the cylinders' bases lying in a plane parallel to the engine plane and connected with said conduit, and spaced branches on said circular part connecting with the said common passage of the respective cylinders.

5. In an airplane engine, a cylinder having a single valve for both intake and exhaust, ports communicating with said valve and opening externally of the cylinder, an exhaust manifold connected to one of said ports, and an intake manifold connected to the other of said ports for supplying air under pressure to said cylinder, said intake manifold extending downwardly and rearwardly of the engine and being open to the slip stream at a point below the fuselage.

6. In a radial aircraft engine, a plurality of cylinders each having a single valve for both intake and exhaust, ports communicating with said valve and opening forwardly and rearwardly, respectively, an exhaust manifold connected to said rearwardly opening ports, and a circular intake manifold positioned adjacent the cylinders' bases connected to said forwardly opening ports, said intake manifold having its inlet end positioned below and to the rear of the engine.

In testimony whereof I affix my signature.

GIUSEPPE M. BELLANCA.